United States Patent [19]
Asanuma et al.

[11] Patent Number: 5,828,972
[45] Date of Patent: Oct. 27, 1998

[54] MOTOR VEHICLE STEERING SYSTEM WITH AUTOMATIC DISTURBANCE SUPPRESSION

[75] Inventors: Nobuyoshi Asanuma; Yutaka Nishi; Takashi Nishimori, all of Tochigi, Japan

[73] Assignee: Honda Giken Kogyo Kabushiki Kaisha, Tokyo, Japan

[21] Appl. No.: 950,081

[22] Filed: Sep. 23, 1992

[30] Foreign Application Priority Data

Sep. 27, 1991 [JP] Japan ................................. 3-277023

[51] Int. Cl.⁶ ............................................. B62D 5/04
[52] U.S. Cl. ............................................. 701/41; 180/446
[58] Field of Search ................... 180/233, 79.1, 180/140, 443, 446; 74/866; 364/424.05, 424.01; 701/41, 42

[56] References Cited

U.S. PATENT DOCUMENTS

| | | | |
|---|---|---|---|
| 4,830,127 | 5/1989 | Ito et al. ........................... | 364/424.01 |
| 4,966,249 | 10/1990 | Imaseki ............................. | 180/233 |
| 4,984,646 | 1/1991 | Sano et al. ........................ | 180/79.1 |
| 5,014,801 | 5/1991 | Hirose .............................. | 180/140 |
| 5,078,226 | 1/1992 | Inagaki et al. .................... | 180/141 |
| 5,094,127 | 3/1992 | Ishida et al. ..................... | 74/866 |
| 5,097,917 | 3/1992 | Serizawa et al. .................. | 180/79.1 |
| 5,225,984 | 7/1993 | Nakayama ........................ | 364/424.05 |
| 5,236,335 | 8/1993 | Takeuchi et al. ................. | 180/79.1 |

FOREIGN PATENT DOCUMENTS

| | | |
|---|---|---|
| 815080 | 2/1957 | United Kingdom . |
| 1411829 | 10/1973 | United Kingdom . |
| 2205541 | 12/1988 | United Kingdom . |

*Primary Examiner*—Michael Zanelli
*Assistant Examiner*—Ed Pipala
*Attorney, Agent, or Firm*—Carrier, Blackman & Associates; Joseph P. Carrier; William D. Blackman

[57] ABSTRACT

A motor vehicle steering system has a yaw rate sensor for detecting a yaw rate of a motor vehicle, and a lateral acceleration sensor for detecting a lateral acceleration of the motor vehicle. The detected yaw rate and lateral acceleration are processed according to predetermined functions to determine a control signal, which is applied to a motor to turn a steering wheel. Road wheels are correspondingly steered through a steering mechanism in a direction to suppress a disturbant motor vehicle behavior that is caused by the yaw rate and the lateral acceleration.

20 Claims, 8 Drawing Sheets

MOTOR VEHICLE STEERING SYSTEM WITH AUTOMATIC DISTURBANCE SUPPRESSION

BACKGROUND OF THE INVENTION

1. Field of the Invention

The present invention relates to a motor vehicle steering system, and more particularly to a motor vehicle steering system which is operable in response to a disturbance-induced motor vehicle behavior for applying a steering torque to a steering wheel to turn the steering wheel in a direction to suppress such a motor vehicle behavior.

2. Description of the Prior Art

One known motor vehicle steering system is disclosed in Japanese patent publication No. 50-33584, for example. The disclosed motor vehicle steering system is an electrically operated power steering system in which the output power of an electric motor which is used to assist in steering the motor vehicle is increased or reduced when a steering wheel is manually turned. More specifically, the amplification degree for a detected signal indicative of a manually applied steering torque varies depending on a detected motor vehicle speed and a detected road condition for thereby increasing or reducing the output power of the electric motor, so that the steering system can produce an optimum overall steering torque at all times.

When the motor vehicle in motion is subjected to a disturbance such as a lateral wind, the above disclosed motor vehicle steering system does not operate to produce a steering torque in a direction to suppress such a disturbance. Generally, manually operated motor vehicle steering systems with no power steering mechanism also fail to generate steering torques which act to reduce disturbing motor vehicle behaviors.

Therefore, when a motor vehicle equipped with a conventional steering system, whether it may be manually operated or power-assisted, is disturbed by a lateral wind or other disturbance, the driver has heretofore been required to manually turn the steering wheel in a direction to minimize the disturbing motor vehicle behavior.

SUMMARY OF THE INVENTION

It is an object of the present invention to provide a motor vehicle steering system which can automatically suppress a disturbing motor vehicle behavior which would occur when a disturbance such as a lateral wind or the like is applied to the motor vehicle.

According to the present invention, there is provided a motor vehicle steering system for use on a motor vehicle, comprising a steering wheel, at least one road wheel steerable by the steering wheel, a steering actuator connected to the steering wheel for turning the steering wheel, sensor means for detecting a motor vehicle behavior induced by a disturbance applied to the motor vehicle, and control means for determining a control signal based on the motor vehicle behavior detected by the sensor means and applying the control signal to the steering actuator to turn the steering wheel in a direction to suppress the motor vehicle behavior.

The sensor means comprises a yaw rate sensor for detecting a yaw rate as the disturbance, and/or a lateral acceleration sensor for detecting a lateral acceleration as the disturbance.

The control means converts the yaw rate and the lateral acceleration into respective components according to predetermined functions, and adds the components into the control signal.

The motor vehicle steering system further includes a steering mechanism for steering the at least one road wheel in response to steering action of the steering wheel. The steering mechanism may be electrically or mechanically operatively connected to the steering wheel.

The above and further objects, details and advantages of the present invention will become apparent from the following detailed description of preferred embodiments thereof, when read in conjunction with the accompanying drawings.

DETAILED DESCRIPTION OF THE PREFERRED EMBODIMENTS

Figure 1:
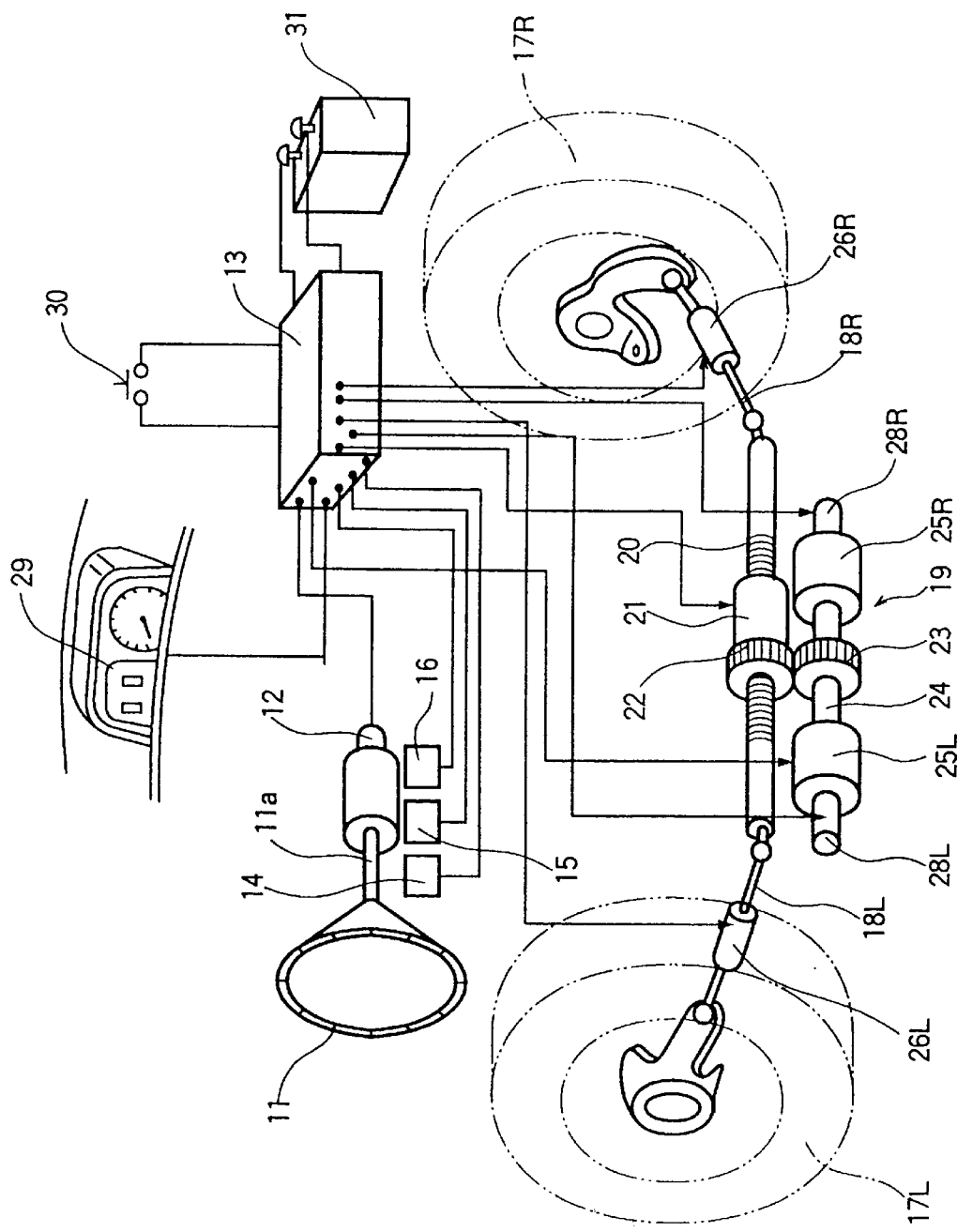
FIG. 1 is a schematic perspective view of a motor vehicle steering system according to an embodiment of the present invention.

As shown in FIG. 1, a motor vehicle steering system according to an embodiment of the present invention is incorporated in a motor vehicle, such as an automobile, having a steering wheel 11 which can be manually turned by the driver. The steering wheel 11 is coaxially mounted on a steering shaft 11a rotatably supported on the body of the motor vehicle and coupled to a reactive motor 12. The reactive motor 12 is electrically connected to a control circuit 13, which energizes the reactive motor 12 to produce a reactive output torque to be applied to the steering wheel 11, i.e., a resistive force or steering reactive force against the steering action of the steering wheel 11.

Figure 2:
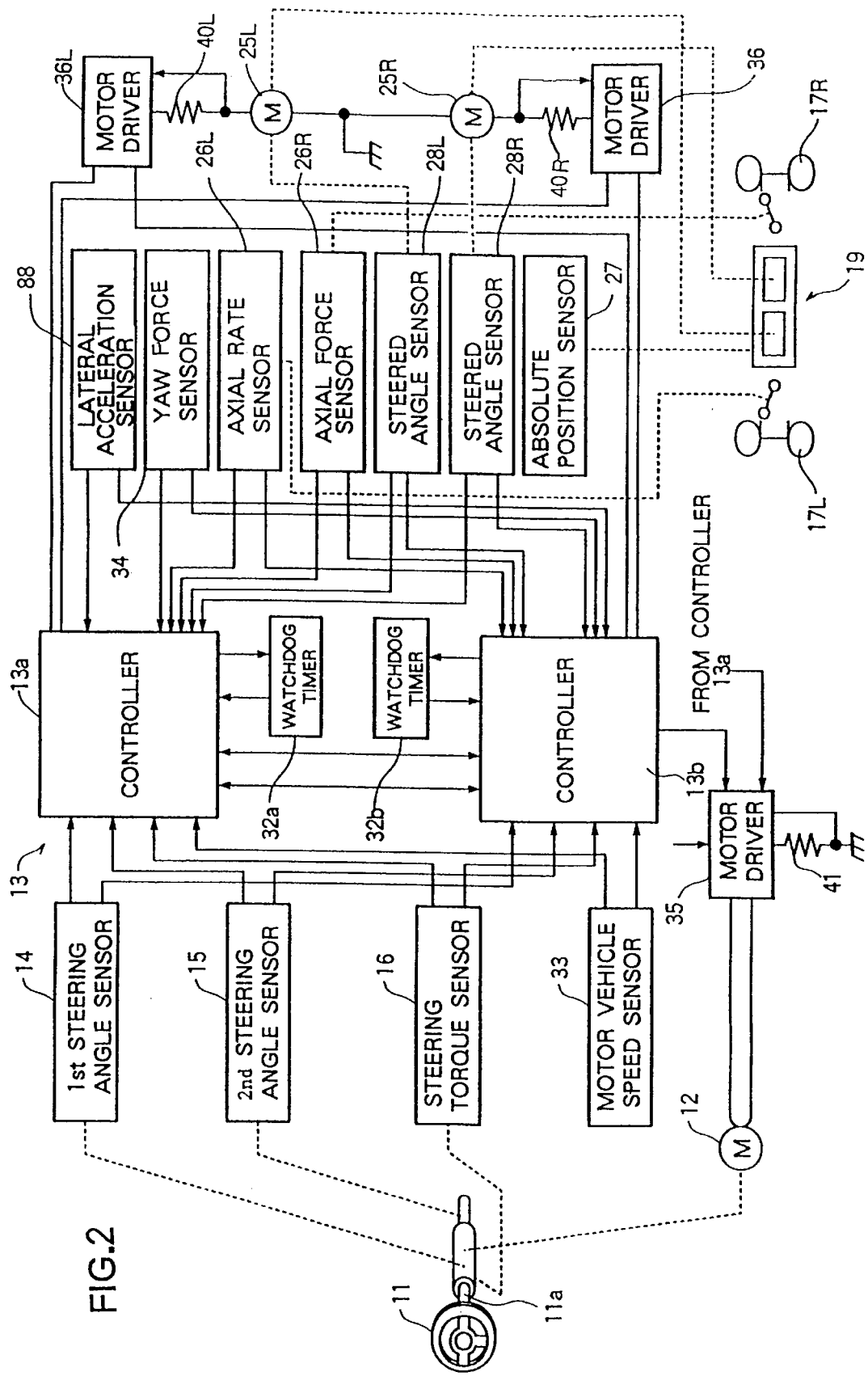
FIG. 2 is a block diagram of a control circuit of the motor vehicle steering system shown in FIG. 1.

The steering shaft 11a is associated with a first steering angle sensor 14 comprising an analog sensor such as a potentiometer, a second steering angle sensor 15 comprising a digital sensor such as an encoder, and a steering torque sensor 16 comprising a differential transformer or the like. As shown in FIG. 2, a current sensor 41 is connected to the reactive motor 12 for detecting an electric current flowing through the reactive motor 12. These sensors 14, 15, 16, 41 are connected to the control circuit 13.

The first steering angle sensor 14 detects an angle through which the steering shaft 11a has rotated from a predetermined position, e.g., a neutral position, of the steering wheel 11, and i.e., detects a steering angle ($\theta$) of the steering wheel 11. The first steering angle sensor 14 sends a detected signal indicative of the steering angle to the control circuit 13. The second steering angle sensor 15 transmits a pulsed signal composed of a number of pulses per unit steering angle of the steering wheel 11, to the control circuit 13. The steering torque sensor 16 detects a steering torque applied by the steering wheel 11, and applies a detected signal indicative of the detected steering torque to the control circuit 13. The current sensor 41 detects an electric current flowing through the reactive motor 12, and hence an output torque of the reactive motor 12, and applies a detected signal representing the detected output torque to the control circuit 13. The control circuit 13 calculates the steering angle through which the steering wheel 11 has rotated from the signals supplied from the first and second steering angle sensors 14, 15. The control circuit 13 also calculates the steering torque applied by the steering wheel 11 from the signal supplied from the steering torque sensor 16.

The motor vehicle has a pair of laterally spaced steerable road wheels 17L, 17R which are operatively coupled to a steering mechanism 19 through respective tie rods 18L, 18R. The steering mechanism 19 comprises a worm shaft 20 with helical threads defined in an outer surface thereof, a ball nut 21 threaded over the worm shaft 20 with a number of balls rollingly riding in the helical threads, and a transmission gear 22 corotatably joined to the ball nut 21.

The worm shaft 20 is supported nonrotatably and axially movably by a housing (not shown), and has its opposite ends connected through the respective tie rods 18L, 18R to the road wheels 17L, 17R, respectively. When the ball nut 21 rotates on the worm shaft 20 with the balls rolling and circulating through the helical threads between the worm shaft 20 and the ball nut 21, the worm shaft 20 is axially moved to steer the road wheels 17L, 17R. The transmission gear 22 is held in mesh with a drive gear 23, which is driven to rotate the ball nut 21 through the transmission gear 22.

The drive gear 23 is fixedly mounted on a rotatable shaft 24 parallel to the worm shaft 20. The shaft 24 is fixedly and concentrically joined to the output shafts of two steering motors 25L, 25R. The steering motors 25L, 25R are electrically connected to the control circuit 13, and associated respectively with current sensors 40L, 40R (FIG. 2), respectively, which detect electric currents flowing through the steering motors 25L, 25R. The current sensors 40L, 40R are also connected to the control circuit 13, and send detected signals indicative of the electric currents passing through the steering motors 25L, 25R to the control circuit 13.

Axial force sensors 26L, 26R are combined respectively with the tie rods 18L, 18R. The ball nut 21 houses an absolute position sensor 27 (FIG. 2) comprising an analog sensor such as a potentiometer. Steered angle sensors 28L, 28R comprising digital sensors such as encoders are associated respectively with the steering motors 25L, 25R. These sensors are electrically connected to the control circuit 13.

The axial force sensors 26L, 26R detect steering reactive forces from the steerable road wheels 17L, 17R, and apply detected signals indicative of the detected steering reactive forces to the control circuit 13. The absolute position sensor 27, like the first steering angle sensor 14, supplies the control circuit 13 with a detected signal indicative of an angle through which the ball nut 21 has rotated from its neutral position, i.e., a steered angle ($\delta$) of the road wheels 17L, 17R from their neutral position. The steered angle sensors 28L, 28R, like the second steering angle sensor 15, supplies the control circuit 13 with a pulsed signal which is composed of a number of pulses per unit rotational angle of the output shafts of the steering motors 25L, 25R, i.e., per unit steered angle of the road wheels 17L, 17R. The control circuit 13 calculates the steered angle of the road wheels 17L, 17R from the detected signals supplied from the absolute position sensor 27 and the steered angle sensors 28L, 28R.

To the control circuit 13, there are also electrically connected an indicator 29, an ignition switch 30, and a battery 31. The indicator 29 serves to indicate a relative deviation or difference between the steering angle $\theta$ of the steering wheel 11 and the steered angle of the road wheels 17L, 17R based on an output signal from the control circuit 13.

As illustrated in FIG. 2, the control circuit 13 includes two controllers 13a, 13b each comprising a one-chip microcomputer, a memory, an A/D converter, a clock generator, etc., the controllers 13a, 13b being connected to each other. Watchdog timers 32a, 32b are connected respectively to the controllers 13a, 13b. The sensors 14, 15, 16, 26L, 26R, 27, 28L, 28R, 40L, 40R, and 41 are also connected to the controllers 13a, 13b. To the controllers 13a, 13b, there are also connected a motor vehicle speed sensor 33, a yaw rate sensor 34, and a lateral acceleration sensor 88. A motor driver 35 for the reactive motor 12 and motor drivers 36L, 26R for the steering motors 25L, 25R are also connected to both the controllers 13a, 13b.

The motor vehicle speed sensor 33 detects a motor vehicle speed and supplies a detected signal indicative of the motor vehicle speed to the controllers 13a, 13b. The yaw rate sensor 34 detects a yaw rate ($\gamma$) of the motor vehicle and supplies a detected signal indicative of the yaw rate to the controllers 13a, 13b. The lateral acceleration sensor 88 detects a lateral acceleration (G) acting transversely to the motor vehicle and supplies a detected signal indicative of the lateral acceleration to the controllers 13a, 13b. The yaw rate sensor 34 and the lateral acceleration sensor 88 individually or collectively serve as a means for detecting a disturbing motor vehicle behavior.

The controllers 13a, 13b simultaneously process the signals from the sensors according to a predetermined routine, and output PWM (Pulse-Width-Modulated) drive signals to the motor drivers 35, 36L, 36P, and a drive signal to the indicator 29. The watchdog timers 32a, 32b monitor intervals at which the routine is executed by the controllers 13a, 13b or periods of operation of internal timers of the controllers 13a, 13b, for any possible malfunction of the controllers 13a, 13b. The controllers 13a, 13b also execute a diagnostic process for each other or check themselves for a fault based on the data from the watchdog timers 32a, 32b. In the event of a fault, the controllers 13a, 13b disconnect a malfunctioning section thereof, and continue to control the motor vehicle steering system.

Each of the motor drivers 35, 36L, 36R comprises a bridge of FETs (Field-Effect Transistors). The motor driver 35 is connected to the reactive motor 12, and the motor drivers 36L, 36R are connected respectively to the steering motors 25L, 25R. The motor drivers 35, 36L, 36R are supplied with PWM drive signals from the controllers 13a, 13b and supply electric currents of duty factors according to the supplied PWM drive signals to the respective motors 12, 25L, 25R.

Figure 3:
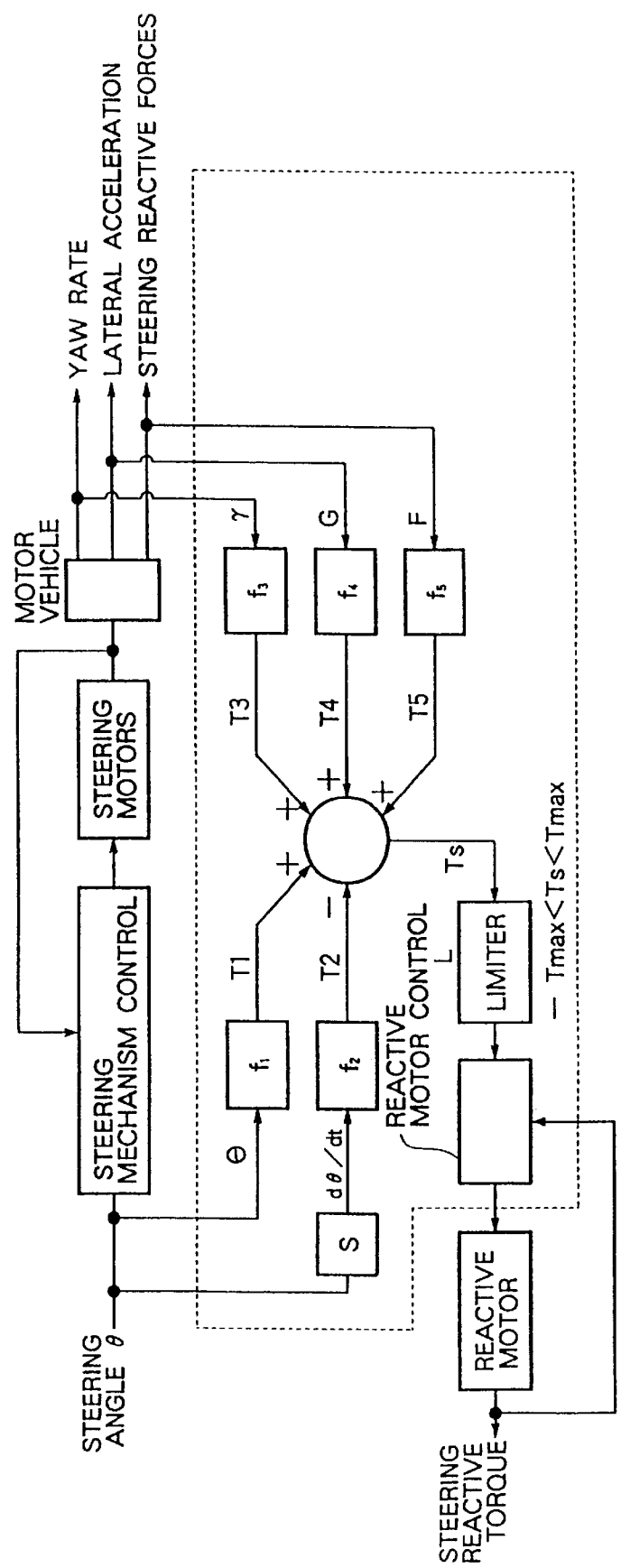
FIG. 3 is a block diagram of a functional system arrangement of the motor vehicle steering system shown in FIG. 1.

The motor vehicle steering system is a CBW (Control-By-Wire) system in which the steering wheel 11 and the steerable road wheels 17L, 17R are mechanically disconnected from each other, but electrically connected to each other for steering the road wheels 17L, 17R. The CBW motor vehicle steering system has a functional system arrangement as shown in FIG. 3. As shown in FIG. 3, the steering action of the steering wheel 11 is detected, and the steered angle $\delta$ of the road wheels 17L, 17R is controlled, by way of feedback control, based on the steering angle $\theta$ of the steering wheel 11. Furthermore, the yaw rate γ of the motor vehicle, the lateral acceleration G applied to the motor vehicle, and the steering reactive forces F from the road wheels 17L, 17R are detected, and the steering reactive force applied to the steering wheel 11 is controlled on the basis of the yaw rate γ, the lateral acceleration G, the steering reactive forces F from the road wheels 17L, 17R, and the steering angle θ of the steering wheel 11.

For the control of the steering reactive force applied to the steering wheel 11, the steering angle θ is converted into a steering angle component T1 of the steering reactive force by a function f1, a steering rate dθ/dt determined, for example, by processing the sensed steering angle θ through a Laplace's operator S is converted into a damping component T2 thereof by a function f2, the yaw rate γ is converted into a first disturbing motor vehicle behavior suppressive component T3 thereof by a third function f3, the lateral acceleration G is converted into a second disturbing motor vehicle behavior suppressive component T4 thereof by a third function f4, and the steering reactive forces F of the road wheels 17L, 17R are converted into a road component T5 thereof by a function f5. These functions f1, f2, f3, f4, f5 are linear functions whose gradients vary depending on the motor vehicle speed, as shown in FIGS. 5(A), 5(B), 5(C), 5(D), and 5(E), respectively. However, it is possible to employ linear functions which do not vary depending on the motor vehicle speed, or other functions.

Then, a target steering reactive force Ts is determined from the above components T1~T5 of the steering reactive force applied to the steering wheel 11 according to the equation:

$$Ts = T1 + T3 + T4 + T5 - T2,$$

and the output torque of the reactive motor 12, i.e., the steering reactive force applied to the steering wheel 11, is controlled so as to reach the target steering reactive force Ts under feedback control. In the above equation, the positive sign indicates the direction of a resistive force imposed against the steering action of the steering wheel 11 in one direction.

In FIG. 3, a function L serves as a limiter for limiting the absolute value of the target steering reactive force Ts within a predetermined range. In FIG. 3, the functions f1~f5 are understood to be transfer functions which can be realized by linear functions. In practice, these functions may incorporate suitable weighting depending on various specifications of the motor vehicle, or may be calculated using tables or maps such as shown in FIGS. 5(A)–5(E), so that the control signal, corresponding to the target reactive force Ts, functions to counteract each of the several components T1–T5 of the control signal in a predetermined manner. The components enclosed by the dotted lines in FIG. 3 correspond to the control circuit 13 shown in FIG. 2.

Figure 4:
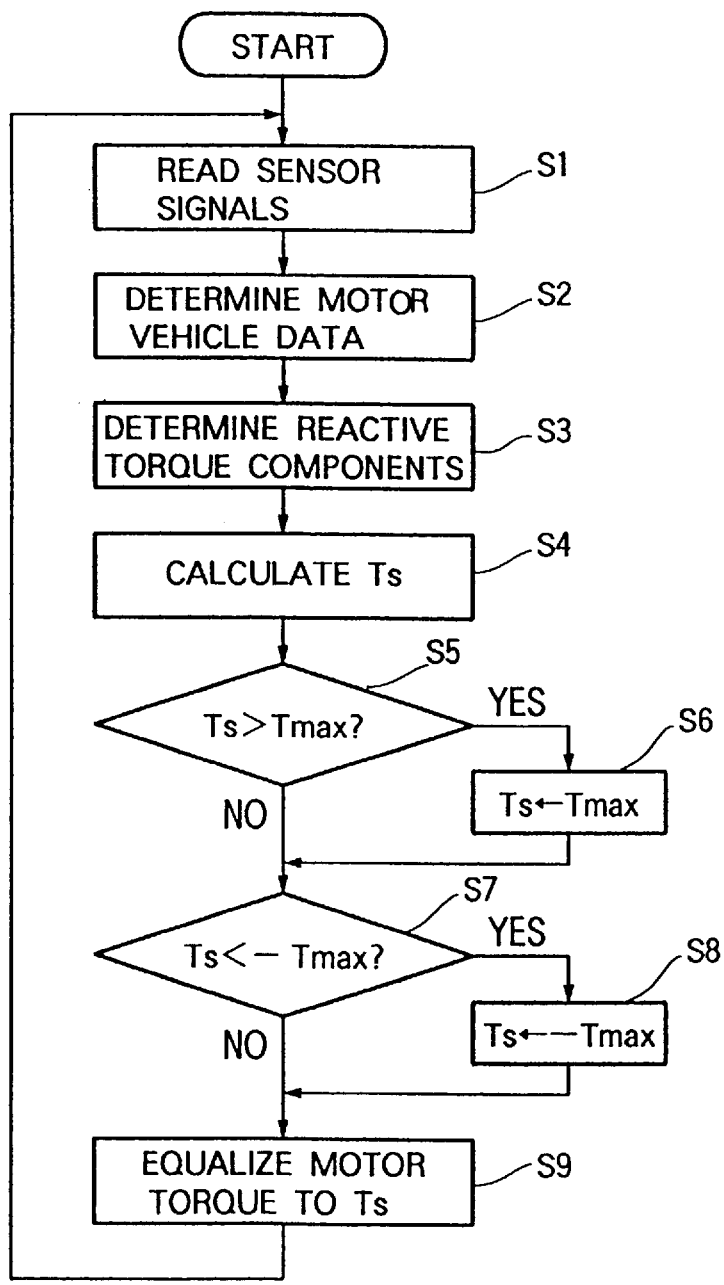
FIG. 4 is a flowchart of a control sequence of the motor vehicle steering system shown in FIG. 1.
Figure 5:
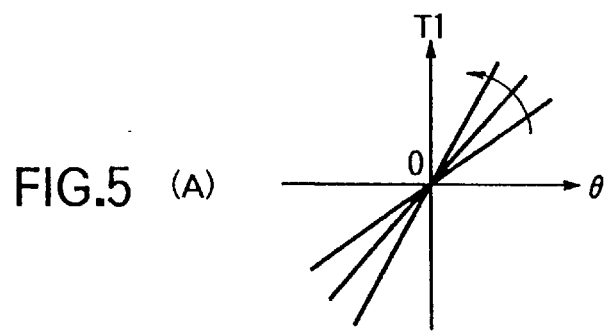
FIGS. 5(A) through 5(E) are diagrams of data tables used in the control sequence shown in FIG. 4.
Figure 5:
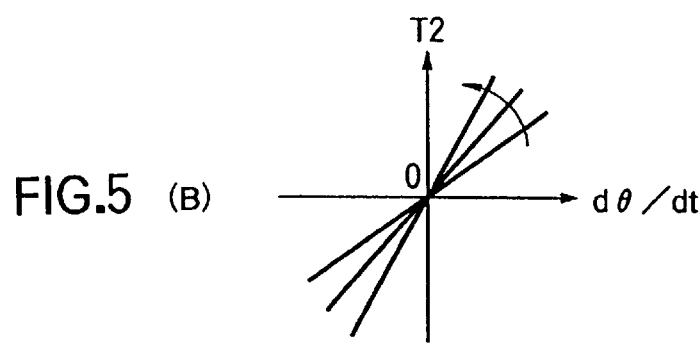
Figure 5:
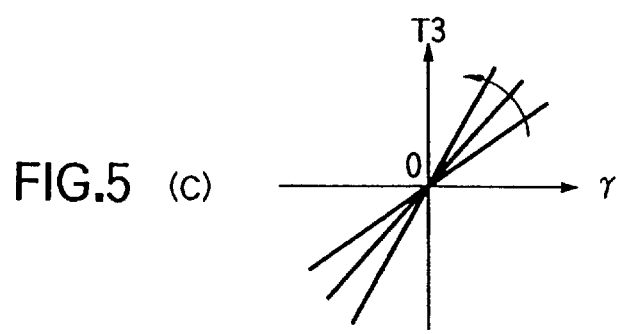
Figure 5:
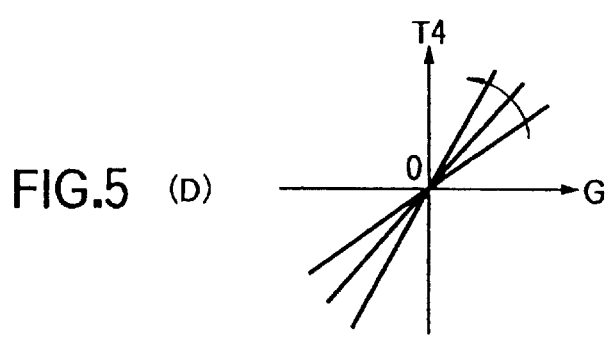
Figure 5:
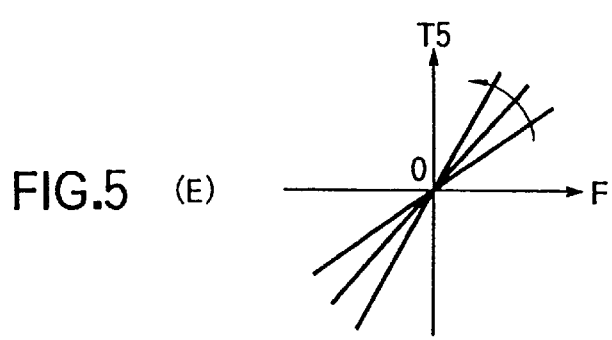

The motor vehicle steering system controls the steering reactive force applied to the steering wheel 11 according to a control sequence shown in FIG. 4 which is repeatedly executed at predetermined periodic intervals. As shown in FIG. 4, the output signals from the various sensors are read in a step S1, and the yaw rate γ, the lateral acceleration G, the motor vehicle speed, the steering torque applied by the steering wheel 11, the steering angle of the steering wheel 11, and other data are determined in a step S2. Then, a step S3 determines the reactive force components T1~T5 according to the data tables shown in FIGS. 5(A)~5(E), and a step S4 calculates a target steering reactive force Ts according to the above equation.

Thereafter, a step S5 determines whether the target steering reactive force Ts is greater than a predetermined value Tmax or not. If the target steering reactive force Ts is greater than the predetermined value Tmax, then the target steering reactive force is set to the predetermined value Tmax as its upper limit value in a step S6. A next step S7 determines whether the target steering reactive force Ts is smaller than a predetermined value—Tmax or not. If the target steering reactive force Ts is smaller than the predetermined value—Tmax, then the target steering reactive force is set to the predetermined value—Tmax as its lower limit value in a step S8. The steps S5, S6, S7, and S8 correspond to the limiter L in FIG. 3.

Subsequently, the reactive motor 12 is controlled to equalize the output torque produced by the reactive motor 12, i.e., the steering reactive force applied to the steering wheel 11, to the target steering reactive force Ts under feedback control in a step S9.

As described above, the steering reactive force imposed on the steering wheel 11 by the reactive motor 12 includes the component T2 corresponding to the steering rate dθ/dt of the steering wheel; the component T3 corresponding to the yaw rate γ of the motor vehicle and the component T4 corresponding to the lateral acceleration G, and the steering reactive force tends to turn the steering wheel 11 in a direction to suppress the yaw rate γ and the lateral acceleration G, and to damp the steering rate dθ/dt. At this time, the steering reactive force serves as a steering torque to turn the steering wheel 11. Therefore, when a disturbance such as a lateral wind is applied to the motor vehicle, causing the motor vehicle to yaw or move laterally, the steering wheel 11 is automatically turned to stabilize the motor vehicle against such a disturbing motor vehicle behavior even if the driver is not gripping the steering wheel 11. If the driver is gripping the steering wheel 11, the driver may let the steering wheel 11 turn under the torque produced by the reactive motor 12, thus stabilizing the motor vehicle against the disturbing motor vehicle behavior.

More specifically, while the motor vehicle is travelling straight ahead, the driver lightly holds the steering wheel 11 in its neutral position. When a lateral wind is imposed on the motor vehicle at this time, the motor vehicle is forced to change its direction, and the change in the direction is detected by the means for detecting a disturbing motor vehicle behavior. As a result, the reactive motor 12 is controlled to produce a steering reactive force (steering torque) which turns the steering wheel 11, whereupon the road wheels 17L, 17R are steered to return the motor vehicle to its straight course. In general motor vehicle running conditions including the above straight travelling situation, the driver can feel a disturbing motor vehicle behavior, such as a yawing motion or a lateral acceleration, through a steering reactive force or steering torque applied from the reactive motor 12 to the steering wheel 11. Significantly, however, the steering reactive force or steering torque applied from the motor 12 is controlled such that the driver is still able to steer the motor vehicle at will by turning or holding the steering wheel 11 against the steering torque which the reactive motor 12 applies to the steering wheel 11.

Figure 6:
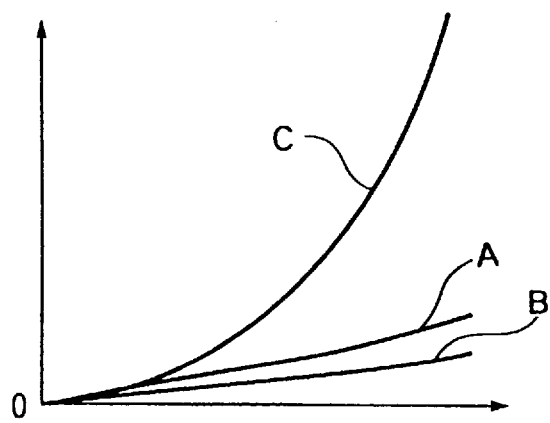
FIGS. 6(A) and 6(B) are graphs showing the effectiveness of the motor vehicle steering system according to the present invention in comparison with a conventional motor vehicle steering system.
Figure 6:
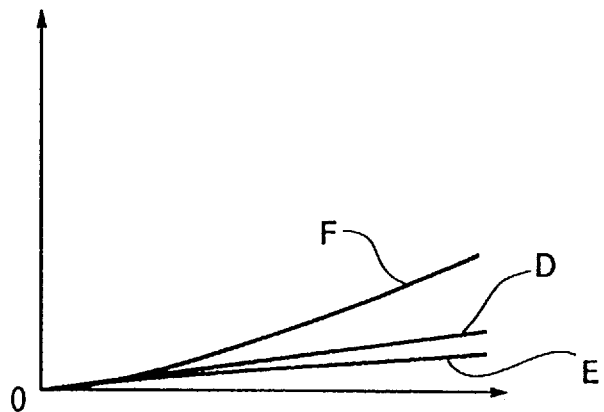

FIGS. 6(A) and 6(B) show how effective the motor vehicle steering system according to the present invention is in comparison with a conventional motor vehicle steering system. In each of the graphs of FIGS. 6(A) and 6(B), the data are measured while the motor vehicle is travelling straight ahead, and the horizontal axis represents the distance X along the direction in which the motor vehicle is travelling straight ahead, and the vertical axis represents the distance Y along a direction perpendicular to the motor vehicle travelling direction.

As shown in FIG. 6(A), when the motor vehicle is subjected to a disturbance such as a lateral wind while driver is not gripping the steering wheel, the motor vehicle moves along a path A under the control of the motor vehicle steering system according to the present invention in which only a yawing moment is reflected in the steering torque applied to the steering wheel, and the motor vehicle moves along a path B under the control of the motor vehicle steering system according to the present invention in which only a lateral acceleration is reflected in the steering torque applied to the steering wheel. On the other hand, the motor vehicle controlled by the conventional motor vehicle steering system is affected much more largely by the lateral wind as indicated by the path C it follows.

As shown in FIG. 6(B), when the motor vehicle is subjected to a disturbance such as a lateral wind while driver is gripping the steering wheel, the motor vehicle moves along a path D under the control of the motor vehicle steering system according to the present invention in which only a yawing moment is reflected in the steering torque applied to the steering wheel, and the motor vehicle moves along a path E under the control of the motor vehicle steering system according to the present invention in which only a lateral acceleration is reflected in the steering torque applied to the steering wheel. These paths D, E are less affected by the lateral wind than the path F which is followed by the motor vehicle that is controlled by the conventional motor vehicle steering system.

During a normal turn, the motor vehicle undergoes a lateral acceleration and a yawing moment, and hence the reactive motor 12 is controlled to produce a steering torque in a direction to reduce the lateral acceleration and the yawing moment, i.e., in a direction to return the motor vehicle to its straight traveling course. For returning to the straight travelling condition, the driver may gradually return the steering wheel 11 under the applied steering torque until the motor vehicle is steered back to the straight traveling course. In the event that the motor vehicle develops an abrupt oversteer tendency, the motor vehicle steering system applies a strong steering torque tending to steer back the motor vehicle, thereby permitting the driver to easily countersteer the motor vehicle. When the motor vehicle drifts, since the steering torque which the motor vehicle steering system applies to the steering wheel is small, the driver can additionally steer the motor vehicle with ease.

In the above embodiment, the steering reactive force or steering torque based on both the yaw rate and the lateral acceleration is imposed on the steering wheel 11. However, the steering reactive force applied to the steering wheel 11 may be based on only the yaw rate or the lateral acceleration. Although the steering rate $d\theta/dt$ is determined from the sensed steering angle $\theta$ in the above embodiment, the steering rate may be directly determined using a suitable sensor in a conventional manner.

Figure 7:
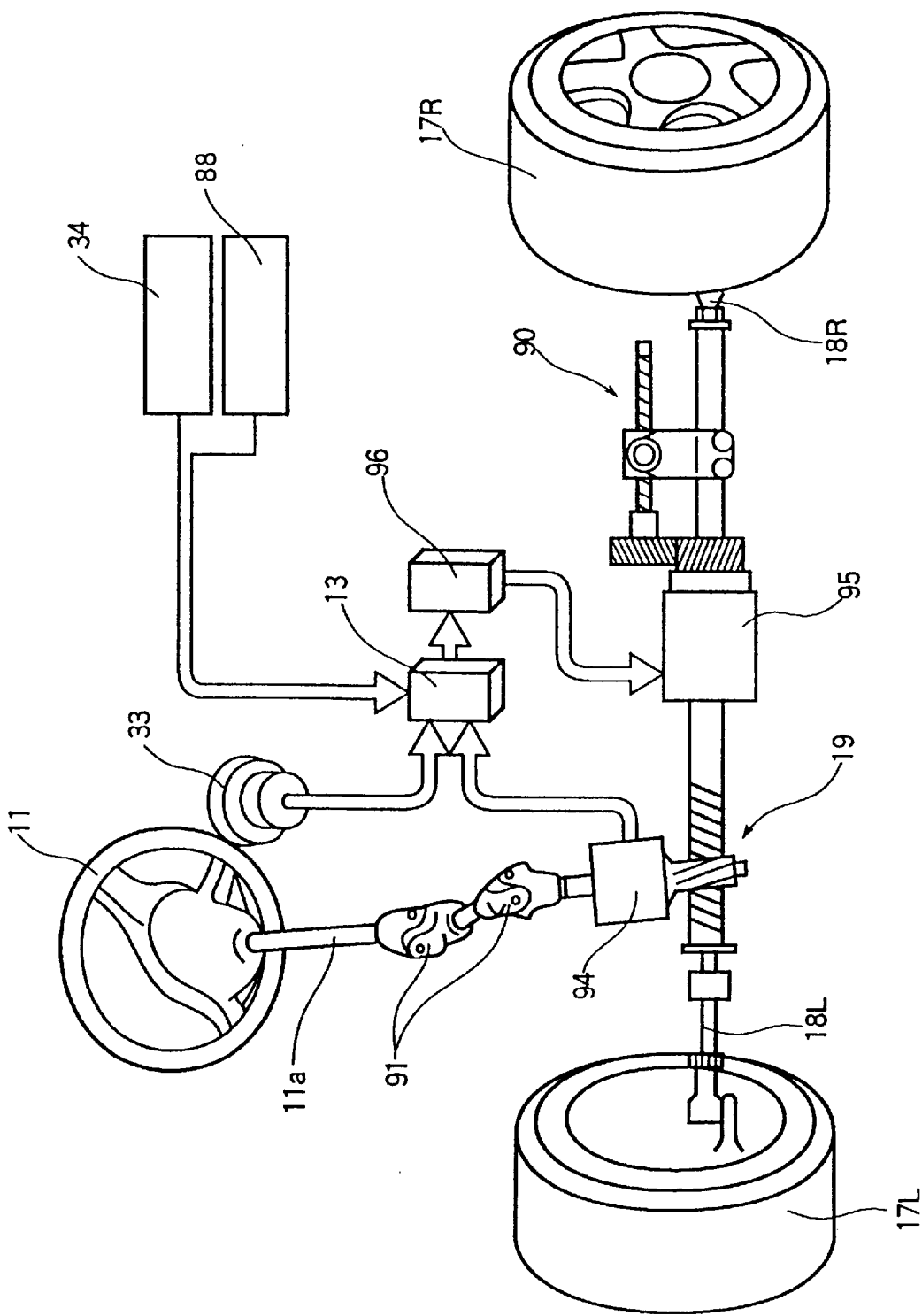
FIG. 7 is a schematic perspective view of a motor vehicle steering system according to another embodiment of the present invention.
Figure 8:
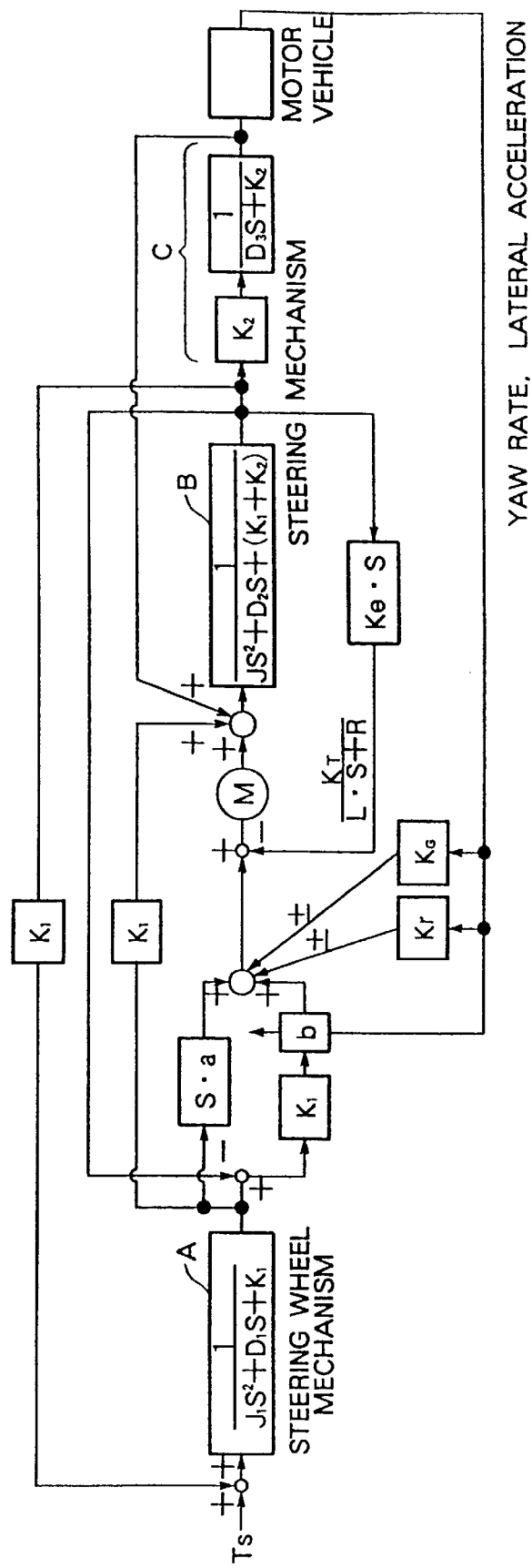
FIG. 8 is a block diagram of a functional system arrangement of the motor vehicle steering system shown in FIG. 7.

FIGS. 7 and 8 show a motor vehicle steering system according to another embodiment of the present invention. Those parts in FIG. 7 which are identical to those shown in FIGS. 1 and 2 are denoted by identical reference characters, and will not be described in detail below.

In FIG. 7, a steering shaft 11a of a steering wheel 11 is mechanically connected to a steering mechanism 19 through joints 91, so that the steering wheel 11 is mechanically coupled to steerable road wheels 17L, 17R. The steering mechanism 19 comprises a rack-and-pinion mechanism having a pinion associated with a sensor 94 for detecting a steering torque and a steering angle, and a rack operatively connected to a ball screw mechanism 90 actuatable by a motor 95. When the motor 95 is energized, it applies an assistive steering torque to the ball screw mechanism 90 which axially moves the rack to cause the tie rods 18L, 18R to steer the road wheels 17L, 17R. The motor 95 is electrically connected to a motor driver 96 which energizes the motor 95 to produce the assistive steering torque.

The motor driver 96 is connected to a controller 13 to which a yaw rate sensor 34 and a lateral acceleration sensor 88 are operatively connected. As with the previous embodiment, the yaw rate sensor 34 serves to detect a yaw rate of the motor vehicle, and the lateral acceleration sensor 88 serves to detect a lateral acceleration applied to the motor vehicle. The speed of travel of the motor vehicle is detected by a motor vehicle speed sensor 33. Detected signals from the sensors 94, 34, 88, 33 are supplied to the controller 13. Based on the supplied signals from the sensors, the controller 13 outputs a control signal to the motor driver 96 to control the motor 95.

In the embodiment shown in FIG. 7, the steering wheel 11 is mechanically coupled to the road wheels 17L, 17R. While the road wheels 17L, 17R can directly be steered by the steering wheel 11, the motor 95 is energized to apply its output steering torque through the ball screw mechanism 90 to the rack for thereby assisting in steering the road wheels 17L, 17R. The motor 95 is effective to determine the assistive steering torque and also the steering reactive force applied to the steering wheel 11.

As shown in FIG. 8, a steering torque Ts, a yaw rate, and a lateral acceleration are detected, and the output torque of the motor M (corresponding to the motor 95 in FIG. 7) is controlled based on the detected torque, yaw rate, and lateral acceleration. Specifically, a target torque is defined as the sum of two components determined from the steering torque, a component determined from the yaw rate by a transfer function, and a component determined from the lateral acceleration by a transfer function, and the output torque of the motor M is controlled to reach the target torque. As with the preceding embodiment, therefore, when the motor vehicle is subject to a yawing moment and a lateral acceleration, the road wheels 17L, 17R are steered in a direction to suppress the yawing moment and the lateral acceleration irrespective of whether the steering wheel 11 is positively turned by the driver or not. Thus, the steering wheel 11 is automatically turned to stabilize the motor vehicle against a disturbing motor vehicle behavior.

In FIG. 8, the steering wheel mechanism has a steering column transfer function A where $J_1$ is the inertia of the steering wheel 11, S is a Laplace's operator, $D_1$ is steering column damping, and $K_1$ is a torque sensor torsion spring constant. The steering mechanism has a gearbox transfer function B where J is the sum of the inertia $J_2$ of the road wheels 17L, 17R and the inertia $J_3$ of the rotor of the motor M, $D_2$ is motor shaft damping, $K_1$ is a torque sensor torsion spring constant, and $K_2$ is a tire torsion spring constant. The road wheel tires have characteristics C where $D_3$ is tire damping. The motor M has electric characteristics where $K_T$ is a torque constant, L is an inductance, R is an electric resistance, and Ke is a counterelectromotive constant. In FIG. 8, furthermore, a is the steering speed gain of the steering wheel 11, b is the torque gain, $K\gamma$ is a yaw rate reactive coefficient, $K_G$ is a lateral acceleration reactive coefficient. The components enclosed by the dotted lines in FIG. 8 corresponds to the controller 13 in FIG. 7.

In the embodiment shown in FIGS. 7 and 8, the transfer function relative to the component of the steering reactive force which corresponds to the steering angle differs for the yaw rate and the lateral acceleration, so that the motor vehicle can be stabilized better. Furthermore, where the transfer functions used are linear functions, the steering torque components can be adjusted by varying the gradients of the linear functions, resulting in a wide range of characteristics that can be selected for high motor vehicle stability.

The other details of the motor vehicle steering system shown in FIGS. 7 and 8 are the same as those of the previous embodiment. The motor vehicle steering system shown in FIGS. 7 and 8 is generally simpler than the motor vehicle steering system according to the previous embodiment.

In the above embodiments, only the control of the steering torque applied to the steering wheel has been described above. However, the control of a steering angle can also be carried out together with the steering torque control. The principles of the present invention are applicable to not only electrical motor-operated motor vehicle steering systems, but alto hydraulically-operated motor vehicle steering systems.

Although there have been described what are at present considered to be the preferred embodiments of the invention, it will be understood that the invention may be embodied in other specific forms without departing from the essential characteristics thereof. The present embodiments are therefore to be considered in all respects as illustrative, and not restrictive. The scope of the invention is indicated by the appended claims rather than by the foregoing description.

What is claimed is:

1. A motor vehicle steering system for use on a motor vehicle, comprising: a steering wheel;
   means for determining a steering rate of said steering wheel;
   at least one road wheel steerable by said steering wheel;
   a steering actuator connected to said steering wheel for turning the steering wheel;
   sensor means for detecting a motor vehicle behavior induced by a disturbance applied to the motor vehicle; and
   control means for determing a control signal at least based on the motor vehicle behavior detected by said sensor means and for applying said control signal to said steering actuator to turn said steering wheel in a direction to suppress the motor vehicle behavior, said control signal including a control component serving to damp said steering rate, determined by said steering rate determinating means, in a predetermined manner.

2. A motor vehicle steering system according to claim 1, wherein said sensor means comprises a yaw rate sensor for detecting a yaw rate as said behavior.

3. A motor vehicle steering system according to claim 1, wherein said sensor means comprises a lateral acceleration sensor for detecting a lateral acceleration as said behavior.

4. A steering system according to claim 1, wherein said sensor means detects a yaw rate and a lateral acceleration of the motor vehicle; and said control means determines two components of said control signal based on the sensed yaw rate and lateral acceleration respectively.

5. A motor vehicle steering system according to claim 1, wherein said control means applies said control signal to said steering actuator to turn said steering wheel during all traveling operations of the vehicle.

6. A steering system according to claim 1, wherein said control means determines said control component using a linear transfer function.

7. A motor vehicle steering system according to claim 1, wherein said sensor means comprises a yaw rate sensor for detecting a yaw rate as said behavior, and a lateral acceleration sensor for detecting a lateral acceleration as said behavior.

8. A motor vehicle steering system according to claim 7, wherein said control means comprises means for converting said yaw rate and said lateral acceleration into respective components according to predetermined functions, and means for adding said components into said control signal.

9. A motor vehicle steering system according to claim 1, further including a steering mechanism for steering said at least one road wheel in response to steering action of said steering wheel.

10. A motor vehicle steering system according to claim 9, wherein said steering mechanism is electrically operatively connected to said steering wheel.

11. A motor vehicle steering system according to claim 9, wherein said steering mechanism is mechanically operatively connected to said steering wheel, said steering mechanism including said steering actuator.

12. In a motor vehicle steering system having a steering handle movable by an operator of the vehicle for controlling steering actions of the vehicle, an improvement comprising:
    means for determining a steering rate of said steering handle;
    means for detecting a motor vehicle behavior induced by a disturbance applied to the motor vehicle; and
    means for applying a force to said steering handle which urges the steering handle to move in a direction that will suppress the motor vehicle behavior, said force including a component serving to damp said steering rate, determined by said steering rate determining means, in a predetermined manner.

13. A motor vehicle steering system according to claim 12, wherein said detecting means comprises at least one of a yaw rate sensor and a lateral acceleration sensor.

14. A motor vehicle steering system according to claim 12, further including a steering mechanism for steering at least one road wheel in response to steering action of the steering handle.

15. A motor vehicle steering system according to claim 14, wherein said steering mechanism is electrically operatively connected to said steering handle.

16. A motor vehicle steering system according to claim 14, wherein said steering mechanism is mechanically operatively connected to said steering handle, and said steering mechanism includes said force applying means.

17. A motor vehicle steering system according to claim 12, wherein said force applying means is adapted to apply a force to the steering handle which may be easily opposed by the vehicle operator.

18. A motor vehicle steering system according to claim 12, wherein said force applying means applies said force to said steering handle during all traveling operations of the vehicle.

19. A steering system according to claim 12, including means for determining said force using linear transfer functions.

20. A motor vehicle steering system for use on a motor vehicle, comprising:
    a steering wheel;
    at least one road wheel steerable by said steering wheel;
    means for determining a steering rate of said steering wheel;
    a steering actuator connected to said steering wheel for turning the steering wheel;

a steering mechanism for steering at least one road wheel in response to steering action of said steering wheel, said steering mechanism being electrically operatively connected to said steering wheel;

sensor means for detecting a motor vehicle behavior induced by a disturbance applied to the motor vehicle; and control means for determining a control signal based on the motor vehicle behavior detected by said sensor means and for applying said control signal to said steering actuator to turn said steering wheel in a direction to suppress the motor vehicle behavior during all traveling operations of the vehicle, said control signal including a control component serving to damp said steering rate, determined by said steering rate determining means, in a predetermined manner.

* * * * *

UNITED STATES PATENT AND TRADEMARK OFFICE
CERTIFICATE OF CORRECTION

PATENT NO  :  5,828,972
DATED      :  27 October 1998
INVENTOR(S):  Nobuyoshi Asanuma, Yutaka Nishi, Takashi Nishimori It is certified that error appears in the above-identified patent and that said Letters Patent is hereby corrected as shown below:

Column 4, 20th line, change "26R" to --36R--;
          line numbered 38, change "36P" to --36R--.
Column 5, line 20, change "third" to --fourth--.
Column 6, line 5, after "force" insert --Ts--;
          line 8, change "value--Tmax" to --value -Tmax--;
          lines 9-10, change "value--Tmax" to --value -Tmax--;
          line 10, after "force" insert --Ts--;
          line 11, change "value--Tmax" to --value -Tmax--;
          line 22, change the semicolon to a comma;
          line 49, change "running" to --traveling--;
          line 50, change "travelling" to --running--.
Column 8, line 65, change "corresponds" to --correspond--.
Column 9, line 19, change "alto" to --also--;
          line 42, change "determining" to --determining--;
          line 60, after "acceleration" insert a comma.

Signed and Sealed this

Twenty-third Day of March, 1999

Attest:

Q. TODD DICKINSON

*Attesting Officer*    *Acting Commissioner of Patents and Trademarks*